United States Patent
Suchard et al.

(10) Patent No.: US 6,950,538 B2
(45) Date of Patent: Sep. 27, 2005

(54) SIGNATURE RECOGNITION SYSTEM AND METHOD

(75) Inventors: Eytan Suchard, Herzelya (IL); Yossi Avni, Herzelya (IL)

(73) Assignee: Computer Associates Think, Inc., Islandia, NY (US)

( * ) Notice: Subject to any disclaimer, the term of this patent is extended or adjusted under 35 U.S.C. 154(b) by 59 days.

(21) Appl. No.: 10/657,282

(22) Filed: Sep. 8, 2003

(65) Prior Publication Data

US 2004/0049411 A1 Mar. 11, 2004

Related U.S. Application Data

(62) Division of application No. 09/482,075, filed on Jan. 13, 2000, now Pat. No. 6,661,908.
(60) Provisional application No. 60/115,867, filed on Jan. 13, 1999.

(51) Int. Cl.[7] ............................................. G06K 9/00
(52) U.S. Cl. ........................................ 382/119; 382/159
(58) Field of Search .................... 382/115–116, 119, 382/157, 159, 181, 187, 190, 197, 209, 218, 224, 225; 348/161; 706/20, 25, 31; 713/201

(56) References Cited

U.S. PATENT DOCUMENTS

| | | | |
|---|---|---|---|
| 4,028,674 A | 6/1977 | Chuang | 382/123 |
| 5,046,019 A | 9/1991 | Basehore | 706/1 |
| 5,164,992 A | 11/1992 | Turk et al. | 382/118 |

(Continued)

OTHER PUBLICATIONS

Tayel, M. et al., Winner–Take–All Neural Network for Visual Handwritten Character Recognition, Proceedings of the Thirteenth National Radio Science Conference, Mar. 1996, pp. C4, 1–11.

Siemens, A.G., Handwritten Digit Recogniton with Principal Component Analysis and Radial Basis Functions, IEEE publications, 1993 International Joint Conference on Neural Networks, pp. 2253–2256.

(Continued)

*Primary Examiner*—Daniel Mariam
(74) *Attorney, Agent, or Firm*—Fish & Richardson P.C.

(57) ABSTRACT

A method of authenticating a signature including the steps of sampling a signature and storing data representative of the signature, converting the data to high dimensions vectors, feeding the high dimension vectors to an unsupervised neural network, performing a high order principal component extraction process on the high dimensions vectors to thereby identifying clusters of high dimension points, and analyzing the clusters of high dimension points to determine, based on previously stored information, the authenticity of the signature. Also an apparatus for such authentication including a sampling device for sampling a signature and storing data representative of the signature, a converting device connected downstream of the sampling device for converting the data to high dimension vectors, an unsupervised neural network for receiving the high dimension and performing a high order principal component extraction process on the high dimensions vectors to thereby identify clusters of high dimension points, and an analyzing device connected to the unsupervised neural network for analyzing the clusters of high dimension points to determine the authenticity of the signature.

13 Claims, 7 Drawing Sheets

U.S. PATENT DOCUMENTS

| | | | |
|---|---|---|---|
| 5,384,895 A | 1/1995 | Rogers et al. | 706/20 |
| 5,442,715 A | 8/1995 | Gaborski et al. | 382/187 |
| 5,465,308 A | 11/1995 | Hutcheson et al. | 382/159 |
| 5,553,156 A | 9/1996 | Obata et al. | 382/119 |
| 5,559,895 A | 9/1996 | Lee et al. | 382/119 |
| 5,568,591 A | 10/1996 | Minot et al. | 706/25 |
| 5,636,291 A | 6/1997 | Bellegarda et al. | 382/187 |
| 5,680,470 A | 10/1997 | Moussa et al. | 382/119 |
| 5,742,702 A | 4/1998 | Oki | 382/156 |
| 5,745,598 A | 4/1998 | Shaw et al. | 382/209 |
| 5,774,571 A | 6/1998 | Marshall | 382/119 |
| 5,812,698 A | 9/1998 | Platt et al. | 382/186 |
| 5,825,906 A | 10/1998 | Obata et al. | 382/119 |
| 5,828,772 A | 10/1998 | Kashi et al. | 382/119 |
| 5,987,232 A | 11/1999 | Tabuki | 713/201 |
| 5,995,953 A * | 11/1999 | Rindtorff et al. | 706/20 |
| 6,084,985 A | 7/2000 | Dolfing et al. | 382/187 |

OTHER PUBLICATIONS

Hyman, S.D. et al., Classification of Japanese Kanji Using Principal Component Analysis as a Preprocessor to an Artificial Neural Network, IEEE publication, 1991, pp. 233–238.

Mao, J. et al., A Self–Organizing Network for Hyperellipsoidal Clustering (HEC), IEEE Transactions on Neural Networks, vol. 7, No. 1, Jan. 1996, pp. 16–29.

Chang, Hong–De et al., Dynamic Handwritten Chinese Signature Verification, IEEE publication, Jul., 1993, pp. 258–261.

Tattersall et al., "*Packed Hyper–Ellipsoid Classifiers*", Electronics Letters, Mar. 3rd,1994, vol. 30, No. 5, p. 427.

Transmittal and Supplementary European Search Report for Application No. 00900301.3, 2 pages, Mar. 1, 2004.

* cited by examiner

SIGNATURE RECOGNITION SYSTEM AND METHOD

CROSS-REFERENCE TO RELATED APPLICATION

This application is a divisional of U.S. patent application Ser. 09/482,075 filed Jan. 13, 2000, now U.S. Pat. No. 6,661,908, and entitled "Signature Recognition System and Method," which claims benefit of U.S. Provisional Application Ser. No. 60/115,867 filed Jan. 13, 1999.

TECHNICAL FIELD OF THE INVENTION

The present invention is directed to signature recognition and authentication and, more particularly, to a signature recognition and authentication scheme employing unsupervised neural networks acting on vectors in high dimensional space.

BACKGROUND OF THE INVENTION

Various types of transactions require a party's signature as an indication of acquiescence to that transaction. For example, signatures are necessary for checks, credit cards and numerous types of legal documents. As a signature often is the only necessary indication of acquiescence to a transaction, forgery of signatures is of great concern.

Early anti-forgery schemes required comparison by a person of an original signature kept on file and a newly executed signature on one of the aforementioned documents. Of course, such human intervention is terribly time consuming and often not reliable.

With increasing computing power, electronic signature recognition and authentication systems have been developed. Such systems typically include an input device such as a digitizing pad or tablet to capture and digitally store the signature image and thereafter act on that stored image in various ways to compare the new signature to a previously-stored "authentic" signature.

For example, U.S. Pat. No. 5,745,598 to Shaw et al. discloses a method whereby a discrete cosine transform or orthogonal transform of the stored signature image is executed. A sequence of global parameters is generated and the image is divided into a plurality of strokes according to segmentation parameters based on the properties of the discrete cosine transform or orthogonal transform. A sequence of feature measurements also are generated and, thereafter, the global parameters, segmentation parameters and feature measurements are stored as representative of the signature. Comparisons are made based on the stored representative characteristics. The method disclosed by Shaw et al., however, is intended to be particularly useful for storing a limited amount of data on, for example, a magnetic card such that verification of signatures can be accomplished at autonomous sites, such as automatic teller machines. Because of the reduced amount of data characterizing any signature, there is, by definition, less reliability in verification.

In U.S. Pat. No. 5,559,895 to Lee et al., there is disclosed a writing pad with a graphics digitizer that converts the continuous lines of the signature into digitized dots. The digitized dots are then located with respect to a coordinate system, and horizontal and vertical coordinates are assigned to each dot. The dots are also assigned values with respect to time. The resulting data represent the simultaneous accumulation of both static and dynamic information. These data are used to calculate each feature of a set of features characterizing the signature. The database used to compare the current signature for the signatory (the person making the signature) consists of a mean and a standard deviation for each feature of the set. While such a system is an improvement over known electronic signature authentication/verification systems, this system is focused on the multi-terminal transaction problem and it too lacks, the reliability necessary for superior signature authentication and verification.

U.S. Pat. No. 5,812,698 to Platt et al. discloses a handwriting recognition system that includes a preprocessing apparatus that uses fuzzy functions to describe the points of a stroke. The final identification of each character is performed by a neural network which operate on "sparse data structures" to identify the character's features. The Platt et al. system is directed to overall handwriting recognition, not signature recognition per se, and thus is deficient in the reliability of recognizing and/or authenticating a signature.

Other systems for signature verification has also been devised in the prior art as well. For instance, U.S. Pat. No. 5,442,715 to Gaborski et al. discloses a method and apparatus for cursive script recognition in which a digital signature is processed neural networks in a time series using moving windows and segmentation. U.S. Pat. No. 5,465,308 to Hutcheson et al. discloses a pattern recognition system where a two dimensional pattern is translated via Fourier transform into a power spectrum and the leading elements of this power spectrum are then used as a features vector and analyzed using a four layer neural network. U.S. Pat. No. 5,553,156 to Obata et al. discloses a complex signature recognition apparatus which utilizes stroke oriented preprocessing and a fuzzy neural network to recognize and verify signatures. U.S. Pat. No. 5,680,470 to Moussa et al. discloses a signature verification system and method in which a signature is preprocessed for test features which may be compared against template signatures to verify the presence or absence of the test features using conventional statistical tools. U.S. Pat. No. 5,828,772 to Kashi et al. discloses a method and apparatus for parametric signature verification using global features and stroke direction codes where the signature is decomposed into spatially oriented, time-ordered line segments. U.S. Pat. No. 5,825,906 to Obata et al. discloses a signature recognition system including a preprocessing subsystem which extracts feature vectors, a recognition network which recognizes patterns and a genetic algorithm used to decide which features are worth considering.

Other related technologies include Optical Character Recognition (OCR) systems and hardware for use in verification systems. For instance, U.S. Pat. No. 5,742,702 to Oki discloses a neural network for character recognition and verification which translates characters into a matrix and identifies the characters using a neural network. U.S. Pat. No. 5,774,571 to Marshall discloses a writing instrument with multiple sensors for biometric verification which includes pressure sensitive cells.

However, these prior art systems fail to provide an effective and particularly reliable signature authentication/verification system which may be readily commercially implemented. Furthermore, with the increasing use of the Internet for a myriad of applications and transactions, verifying accurately and reliably a signature on-line is particularly desirable.

SUMMARY OF THE INVENTION

In view of the desire to provide an effective and particularly reliable signature authentication/verification system, it is an object of the present invention to provide a signature authentication/verification method and apparatus that preferably employs self organized neural networks.

It is a further object of the present invention to minimize calculation time and computer memory resources preferably by implementing a predefined process portion that implements hierarchical iconic zooming to convert signature raw data. In an alternative embodiment, a "What/Where" network preferably replaces the hierarchical iconic zooming process.

It is yet another object of the present invention to implement an unsupervised neural network to analyze the output of the hierarchical iconic zooming stage. It is still another object of the present invention to provide at least one stage of component integration wherein the response of the neural network is analyzed.

It is another object of the present invention to implement an improved Pi neuron in a second stage of component integration whereby an improved response analysis can be performed.

It is still another object of the present invention to implement in a signature authentication system a means for assessing overgeneralization and effectively counteracting the effects thereof.

In accordance with the present invention there is provided a signature verification system that implements a unique combination of concepts to achieve the desired verification and authentication analyses. One concept is recursive zooming, which is a process that takes signature data and converts the same to a set of vectors in high dimensional space. Another concept is execution of a cumulative orthonormalization process, a new method for calculating correlation ellipsoids or spheres that contain a group of points in high dimensional space. While many other concepts are described and combined to achieve the present invention, the two concepts mentioned immediately above, either alone or in combination with the other inventive features described herein have, to date, never been applied to a signature verification or authentication system.

As discussed previously, the present invention is used to (1) verify and/or authenticate a user's signature against forgery and/or to (2) biometrically recognize and/or verify a particular person. The method and apparatus (system) of the present invention operates in two phases. In a first, or learning, phase, the system learns to recognize a user's signature. For this phase, the user provides several repeatable samples of his signature. The system then analyzes the samples, identifies significant characteristics thereof and learns both to recognize the signature itself and to distinguish the way it is written. In a second, or user verification, phase, the system determines if an input signature matches the samples obtained during the first, or learning, phase.

Thus, in accordance with the present invention, it is significantly more difficult to successfully forge a signature since the forger not only must know how a signature looks, but also how the signature is written. Consequently, the system of the present invention also is very useful as a biometric authentication device and method.

Generally, there are five main sub-systems comprising the present invention: input, recursive zooming, unsupervised neural network and components integrator. Each of these is discussed in brief below and is elaborated upon in the Detailed Description.

(A) Input. The input component receives a signature using an input device, e.g. a mouse, pen or tablet, and generates a description of the signature. The description of the signature preferably is a listing of time and corresponding location in x-y coordinates of the input device.

(B) Recursive zooming. The recursive zooming feature serves a plurality of purposes. The first preferably is to convert the signature to a standard form. This is desirable in that several signatures by the same person are almost never identical. For example, the signature may be smaller or larger, stretched or slightly rotated. To be able to recognize any of these "same" signatures it is desirable that the system ignore such discrepancies. By converting the signature to a format that does not depend on the signature size or rotation, the system can ignore these factors and therefore can more accurately compare signatures.

Another feature derived from recursive zooming is conversion of the signature to a form that easily can be handled by a downstream neural network. Because unsupervised neural networks (implemented in the present invention) learn to recognize collections of vectors in high dimensional space, the present invention preferably represents the signature in such a collection. That is, the recursive zooming feature of the present invention converts the time/location representation into a collection of vectors in a high dimensional space.

(C) Unsupervised neural network. Unsupervised neural networks are a collection of neurons that can learn to identify clusters of vectors in space, where each neuron identifies a cluster. The network preferably operates in at least two modes. In the learning mode the neurons learn to identify the clusters or a portion thereof, and in the response mode, each neuron responds to vectors that likely belong to the cluster it learned to recognize. In one preferable embodiment, ellipsoid neurons are used for recognizing ellipsoid clusters. In another preferred embodiment, bubble-shaped neurons are implemented for recognizing clusters that are circular.

(D & E) Component integrators, first and second stages. In the learning phase, the component integrators analyze the network response to the sample signature. In the verification stage, the component integrators compare the network response to the signature with the data collected during the learning process. If a "strong" match exists, the signature is deemed authentic. If not, the signature is deemed likely forged.

BRIEF DESCRIPTION OF THE DRAWINGS

The above and other objects, features and advantages of the present invention will become apparent from the following detailed description which is to be read in conjunction with the accompanying drawings, in which.

DETAILED DESCRIPTION OF THE INVENTION

Figure 1:
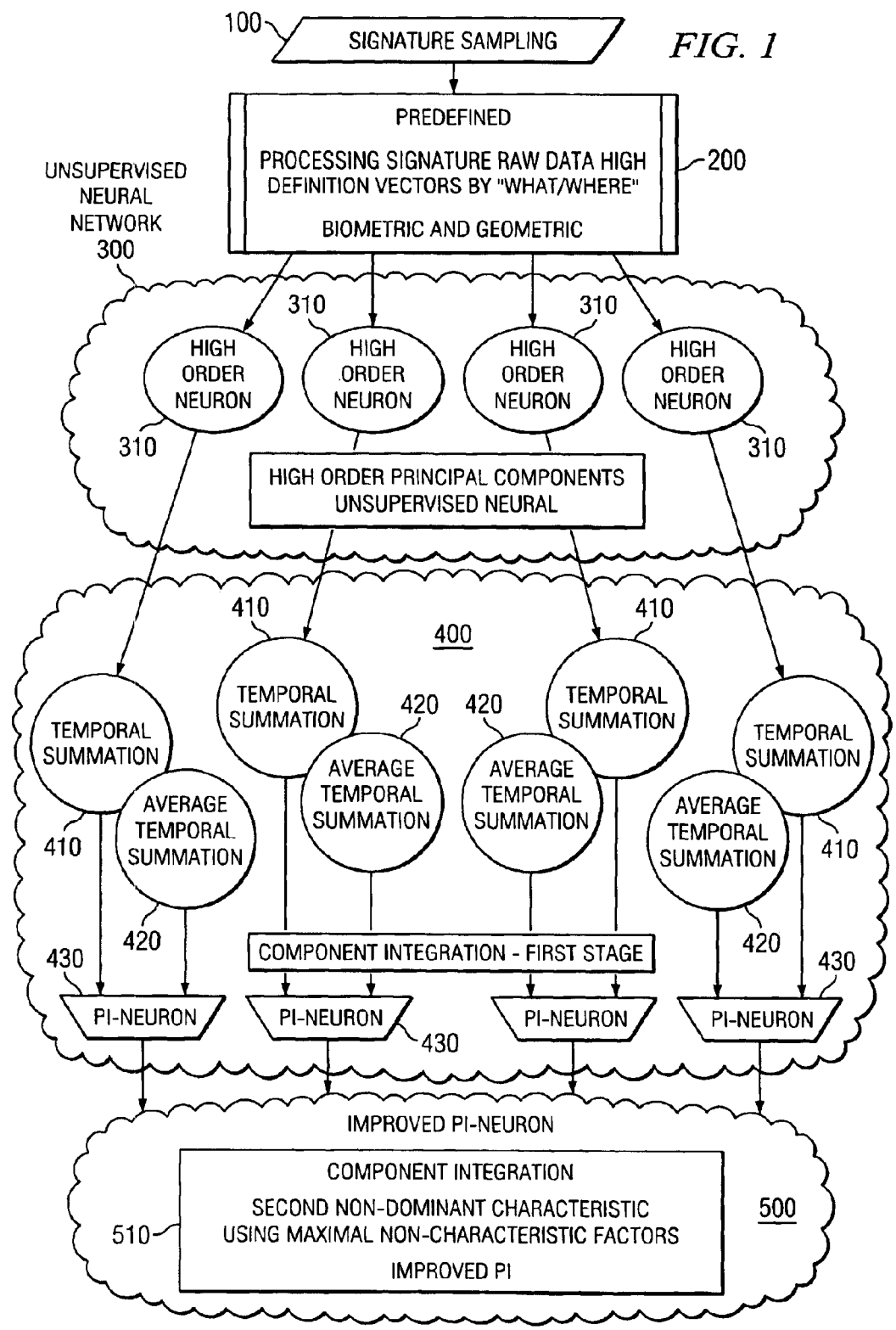
FIG. 1 depicts in schematic form the signature verification system of the present invention.

The following provides a detailed description of the preferred embodiments of the present invention, beginning first with definitions of terms that are used herein.

Definitions

Soft Computing—Soft computing is a method by which problems are solved when an algorithm is not available or can't be defined.

Neural Networks—A Soft Computing system, which solves problems by using adaptive local resolution nodes. Each such node has input lines (in human neural cell called "dendrites") and one output line (in human neural cell called—"axon"). The node learns to respond to input patterns, which are received in the input lines ("dendrites").

Self-Organized Neural Networks—A neural network, which learns to identify characteristics of input patterns and hidden correlation without external intervention.

Intrinsic Geometry—A mathematical theory that deals with measurements of geometric objects such that the measurements do not depend on any coordinate system. Usually the values which are explored by Differential Geometry and by Einstein's General Theory of Relativity (Ricci Curvature=$R_{kj}g^{kj}$) are Intrinsic Scalars. Intrinsic geometry can be represented by Tensors or Spinors (Gauge Theory) but it can be also represented by high order neurons, which use Tensors or Spinors. This also has significant value in the development of a new General Relativity theory based on Self-Organized Neural Networks.

Generalization—The ability to recognize patterns which, differ from the learnt patterns but have common characteristics with the learnt ones. This is the most important merit of neural networks. It represents a type of data compression. It turns the neural networks into systems, which solve problems, which were not encountered before.

"What/Where" neural network—A neural network in which there are at least two layers. Each layer is a neural network. The first layer is usually made of different sizes of receptive fields. These receptive fields can have different shapes but usually one common shape is used, such as a disk (filled circle). The input dendrites within a receptive field become the input of the first layer. This layer is called the "What" layer. Usually the "What" layer is made of High Order neurons, which form a Self-Organized Competitive Neural network. The "Where" network scans the original or processed pattern via receptive fields (or Input Mask—a predefined shape of connected pixels). It uses the "What" network as a look up table and therefore different areas on the pattern are identified by different "What" neurons. For generalization purposes the resolution of the "Where" network is less than the resolution of the pattern. The output of the "Where" network can become the input of the next "What/Where" layers. This description is typical as a unique interpretation of Infilight Soft Computing Ltd. and therefore may differ from common definitions.

"Eigenvalues" of a BiLinear Form—the values of vectors V for which the representation matrix A of the Bilinear Form is diagonal.

"Eigenvectors" of a Bilinear Form—the base vectors in which the Bilinear representation matrix A of the Bilinear Form is diagonal.

diagonalization—A process by which a Bilinear Form representation matrix A becomes diagonal.

Principal Components—These are the "Eigenvectors" of the correlation matrix.

High Order Principal Components—Vectors by which High Order Tensors can be partially diagonalized. Usually Tensors of third orders and above can not be diagonalized (a Tensor $A_{ijk}$ can not be presented as $A_{kkk}=\lambda$ and for $i \neq j$ or $i \neq k$ or $j \neq k$, $A_{ijk}=0$).

Correlation Matrix—The matrix of random variables correlations for which $A_{ij}$ equals $Ex_i x_j - Ex_i^* Ex_j$.

Unbounded Growth—An unwanted phenomenon in which internal values of a neuron grow too much. This problem can cause a competitive neural network to become a one neuron network (because the other neurons never win/learn). This problem is also called degeneration.

Pi-neuron—A neuron in which instead of using summations of input dendrites, a multiplication is used. This neuron is usually used as a statistical AND operator.

Temporal summation neuron—A neuron that performs an integral operator on the input values. In our model we just use a first order neuron. In biology, such neurons exist in the Thalamus (an area in the mid-brain) and have important role in primitive biological functions. Important researches about pain and Temporal summation were done by Dr. Lautenbauscher in Germany. (*Tonic Pain Evoked By Pulsating Heat: Temporal Summation Mechanisms*, by Lautenbauscher, Roscher, Strian; Somatosensory and Motor Research Vol. 12(1) pp. 59–75 (1995)).

Oja—Please refer to "Adaptive Cooperative Systems" by Martin Beckerman pp. 319–8.11.5,320–8.11.6 (1997, John Wiley & Sons, Inc., ISBN 0-471-01287-4).

Linsker—Please refer to "Adaptive Cooperative Systems" by Martin Beckerman pp. 319–8.11.5, 320–8.11.6 (1997, John Wiley & Sons, Inc., ISBN 0-471-01287-4).

Component Integration—A process by which a neural network verifies that different parts of a whole pattern exist simultaneously.

Next, the system of the present invention is described in detail.

Description of the Preferred Embodiments

The signature authentication/verification system of the present invention introduces a new concept for using an unsupervised neural network for signature authentication/verification. The invention comprises an adaptive cooperative system, which uses cooperation between different Unsupervised Neural Networks. The main process is divided into five stages. Each stage performs a main sub-process, shown in FIG. 1. As shown in the illustrated example of FIG. 1, the main process is divided into five stages or five sub-processes as follows:

A—Signature sampling—The system samples a signature as depicted at reference numeral 100, FIG. 1. Signature sampling is implemented via an input device that translates hand movements to locations. The most common devices are a mouse, mouse like devices, pressure sensitive pads, tablets, styluses and/or electronic pens. The signature sampling sub-system collects the device data and generates a list of time/location pairs.

It is noted that some input devices can also sense pressure. Though this information can be used for authentication, as different persons apply different pressure in the same place in a signature, a pressure variable is not relied upon by the present invention for reliable results since many input devices do not support pressure measurements. On the other hand, the system of the present invention can be even further improved by the addition of a pressure measurement.

Preferably, the input device provides information in sufficient detail to support the system of the present invention. Specifically, a preferable rate of information is at least about 40 samples per second. With lower sampling rates there typically is insufficient information to characterize a signature. Furthermore, the signature sampling process should take, on the order of, about one second or more.

B—Predefined Process—The system translates the raw data into high dimension vectors, FIG. 1, element 200. These vectors represent the biometric and geometric characteristics of the learned signature. The vectors represent a unique "What/Where" analysis, which differs from the concurrent Cooperating "What/Where" neural networks analysis. The method tends to extract Intrinsic Geometry correlations.

More specifically, in the predefined process a recursive zooming process is implemented whereby time/location pairs generated by the signature sampling are reconstituted into a set of high dimensional vectors. All the results of the recursive zooming are relative to the sample signature. By using relative measurements, dependence on size and rotation is avoided.

Each high dimensional vector is generated by recursively focusing on smaller and smaller details of the signature. Each step in the process looks at smaller details (defined by a shorter time span) and generates more coordinates in the vector. Various schemes can be devised for both the zooming in and coordinates generation. However, in a preferred embodiment of the present invention, the predefined process preferably generates 26 dimensional vectors using 13 iterations. Vectors are generated as follows:

(a) The time period examined in the first iteration is between 50% and 70% of the signature time (with steps of 2%);

(b) The time period examined in the second to 13th iterations is 70% of the time period examined in the previous iteration; and (c) The time period in each iteration is either in the start of the time period of the previous iteration, or in its end (but not in the middle).

Each iteration adds two coordinates to the vector. These coordinates are calculated from the difference along the X and Y axes between input device position at the start of the examined time period, and its position at its end. To avoid dependence on the size of the signature, the differences in locations are divided by the distance between the input device locations at the start and the end of the time period examined in the previous iteration. In addition, there preferably is provided a division-by-zero prevention algorithm. It should be noted that the above described percentage of time period examined and the number of iterations is merely an example of one embodiment of the present invention. Theoretically, higher percentages (of time period examined) and higher iterations may be used which will yield better results. However, such increase in percentages and iterations would require increased computing and system capacity. Thus, under present state of technology and economics, the above embodiment has been found to provide sufficiently accurate results considering the economic costs.

C—Unsupervised High Order principal components extraction—The system learns the clusters, at reference numeral 300, which are formed by the thus generated vectors in a high dimension Real Numbers Space—$R^n$. The system uses principal components elliptic extraction in a unique method. The principal components ("Eigenvectors" and "Eigenvalues" of the correlation matrix) are calculated using a geometric method of Cumulative Ortho-Normalization. This method saves the use of a correlation matrix and it's diagonalization. Moreover, the vectors of the principal ellipsoid main directions may not need double precision 8 bytes variables. Only the "Eigenvalues" require double variable types. The problem of unbounded growth of the ellipsoids is solved by a digital condition rather than using solutions such as Oja's solution or Linsker's model. This digital condition eliminates the use of punishment rules on "too big" neurons.

In other words, in FIG. 1, neurons 310 in unsupervised neural networks 300 learn to recognize clusters of vectors in a high dimensional space. The generic learning scheme is that the vectors are fed into the network. The neuron closest to the added vector adds it to the cluster it recognizes, and modifies the location and size of the cluster to reflect the information gained from adding the new vector. The system uses a "standard" neural network, but with two variations. The first variation is an unbounded growth rule, which is used to prevent one neuron from growing too much so as to recognize all vectors as belonging to a single cluster. This rule is explained in more detail later herein.

The second variation is a unique process that is used for finding the resultant ellipsoids. When using ellipsoid neurons, each neuron learns to identify an ellipsoid-shaped cluster. The problem is that the neuron has to find the ellipsoid's main directions and sizes.

The standard approach to finding the ellipsoid main directions is to calculate the correlation matrix of the distributions of the vectors along each axis. The Eigen-vectors of this matrix are the ellipsoid main directions. The Eigen-values of the matrix are the variance of the vectors along each of the main directions. When taking the ellipsoid sizes to be twice the standard deviation along each of the main directions, the ellipsoid covers 95% of the vectors, thus defining the cluster.

The major drawback of this approach is that whenever a new vector is entered to the network, the correlation matrix should be updated, and the Eigen-vectors should be found. For large matrices, however, this process is very time consuming.

Thus, in accordance with the present invention, there is provided a method called Cumulative Ortho-Normalization which is a unique method to find the main directions and sizes of ellipsoids and/or spheres. The method is based on the observation that the average of all the points in one hemisphere of the ellipsoid points to the main direction. To account for all the vectors in the cluster, the Cumulative Ortho-Normalization method computes the average of all the vectors that are in one hemisphere and the reverse of the vectors in the other hemisphere. To find the other main directions of the ellipsoid, the process is repeated, but each time, the components that lie along the main directions found so far are subtracted from the vectors. Sizes are, again, computed as twice the standard deviation of the vector components along the main directions.

To avoid the need to average all the vectors whenever a new vector is added to the network, the system assumes that the new point does not change the average by too much, thus, the system can rely on the directions and sizes found after the previous vector was added. The implication of this assumption is that the ellipsoid found is an approximation of the right ellipsoid. This approximation becomes better as the number of vectors increases. Several hundred vectors result in an approximation that is sufficient for all practical purposes.

It should be noted that analysis of the clusters created by the recursive zooming sub-system shows that these clusters tend to be circular. As such, ellipsoid neurons have little advantage over circular/bubble-shaped neurons. Indeed, it has been found that an advantage of bubble-shaped neurons is that they are symmetrical and as a result, there is no need to find main directions, thus improving the learning time and reducing the amount of memory necessary to implement the system. Further, the radius of the balls is the standard deviation of the distance of the vectors for which a neuron won. Thus, such circular/bubble shaped neurons may be alternatively used in other embodiments of the present invention. The radius of the balls preferably is used only in the Component Integration—first stage process. This is possible due to the special nature of the clusters that are formed by the predefined process, Le., recursive zooming. However, because ellipsoid neurons provide improved accuracy (although the improvement may be small), the embodiment using ellipsoid neurons are discussed in further detail. In this regard, it should be appreciated by a person skilled in the art that the teachings regarding the ellipsoid neurons may be readily applied to circular/bubble shaped neurons. Indeed, the circular/bubble shaped neurons may be considered to be a special embodiment of the ellipsoid neurons discussed herein.

D—Component Integration—first stage—Component integration 400 is a method for verifying that the geometric and biometric components of the learnt signature also exist in a compared signature.

This method relies on three types of unique neurons as follows:

D.1—The Temporal Summation neuron, 410

D.2—The Average Temporal Summation neuron, 420

D.3—Pi-neuron, 430

D.1) In the Component Integration—first stage, each temporal summation neuron 410 learns the relation between the number of vectors within an ellipsoid and the total number of vectors. It remembers the average of these ratios and the standard deviation.

D.2) A second type of neuron, the average temporal summation neuron 420, learns the average distance of vectors within an ellipsoid. It learns the average of these averages and their standard deviation.

D.3) The Pi-neuron 430 multiplies the statistical distance of the last two neurons.

E—Component Integration—second stage—This neuron is an improved Pi-neuron 500 wherein, unlike a regular Pi-neuron that multiplies unprocessed values, it sorts its input dendrites in a descending order of intensities and finds the minimal sorted index for which the multiplication is less than one. The maximal worst case happens when this index has its greatest value. This means that too many Temporal Summation and Average Temporal Summation neurons report big standard deviations. Non-Dominant Characteristic Extractor means 510 is provided, which extracts the most deviated by multiplying the sorted values of standard deviation or variances.

As a result of this analysis, the system calculates the abnormal deviation from the compared/learnt original signature.

In a more generalized explanation, the purpose of the component integrator is to match the neural network response to a signature with the neural network response to the samples provided in the learning phase. For each signature, and for each neuron, the neuron response to the signature is calculated. The neuron response to a signature is represented using two numbers. The first number, which is named the "global response," is the percentage of the vectors the neuron responded to. The second number, the "local response," is the average of the distances from a vector the neuron responded to, and the center of the neuron.

The component integrator measures by how much the response of a neuron to a signature deviates from the average response to the sample signatures. These numbers are then fed to an improved Pi neuron 500, whose result is the measure of matching between the signature and the samples provided in the learning phase. Improved Pi neurons are components that operate in two modes. In a learning mode they learn the number of significant inputs they have and in an operation mode, they output the multiplication of the significant inputs. A more detailed explanation of this aspect of the present invention follows.

It is again noted that the above discusses merely one example of the present invention. The remainder of this disclosure is directed to a comprehensive mathematical discussion of each of the above sub-systems or components in accordance with one embodiment of the present invention and, ultimately, how the entire system functions as a whole unit, including the differences between learning and comparison.

Mathematical and Comprehensive Description

Again, the signature authentication system of the present invention comprises five sub-processes or sub-systems as follows:

A—Signature sampling, 100:

B—Predefined process—Biometric & Geometric Analysis, 200.

C—High Order principal components extraction process, 300.

D—Component Integration—first stage process, 400.

E—Component Integration—second stage process, 500.

A—Signature Sampling Process

Figure 2:
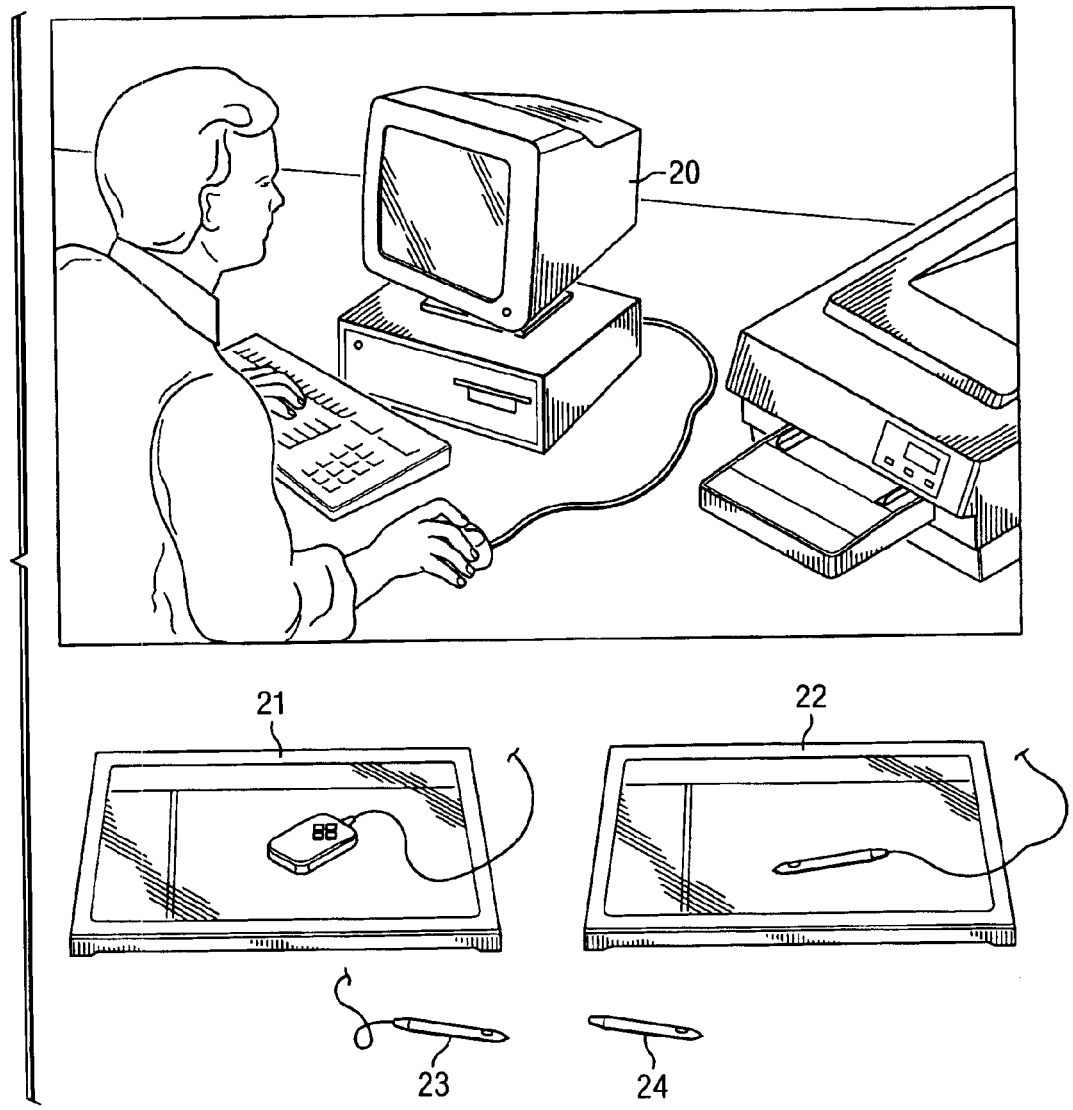
FIG. 2 shows various types of pointing devices operable with the present invention.

Sampling in the present invention preferably is implemented with a personal computer 20 with any attached standard input pointing device, like devices 21, 22, 23, 24 shown in FIG. 2, or any other like device. An application running on personal computer 20 samples the human signature in real time (by using a high priority thread) at a sufficiently high constant rate, preferably approximately every 7 milliseconds. In a preferred embodiment, the signature sampling process is initiated only when a click event occurs. The following three-dimensional values are sampled:

X—x coordinate.

Y—y coordinate.

$\Delta t$—derived from the constant sampling rate.

These three-dimension vectors are buffered into a raw data array. Signatures can differ in the length of their raw data array. Incidentally, the click value may also be relied upon as an additional feature by calculating the distance between two discontinued points. Furthermore, and as mentioned previously, because many input pointing devices can not sample the pressure, pressure need not be monitored in a best mode of the present invention. However, using an appropriate device for sampling values of the pressure, a fourth dimension can be defined. And, an even more accurate signature authentication can be achieved by using this additional dimension.

B—Predefined Process—Biometric & Geometric Analysis.

In this process the purpose is to convert the three dimensions raw data vectors to high dimensions vectors. In that specific application the conversion process translates the three dimensions vectors into 26 dimensions vectors. The conversion vectors are generated, by a hierarchical zooming on the time intervals of the signature. For example, a sampled signature consists of 201 points, 200 time intervals of 7 milliseconds each. For such a signature, an array of 201 two-dimensional points is built. The time is included in the array index beginning from 0 up to 200.

Figure 3:
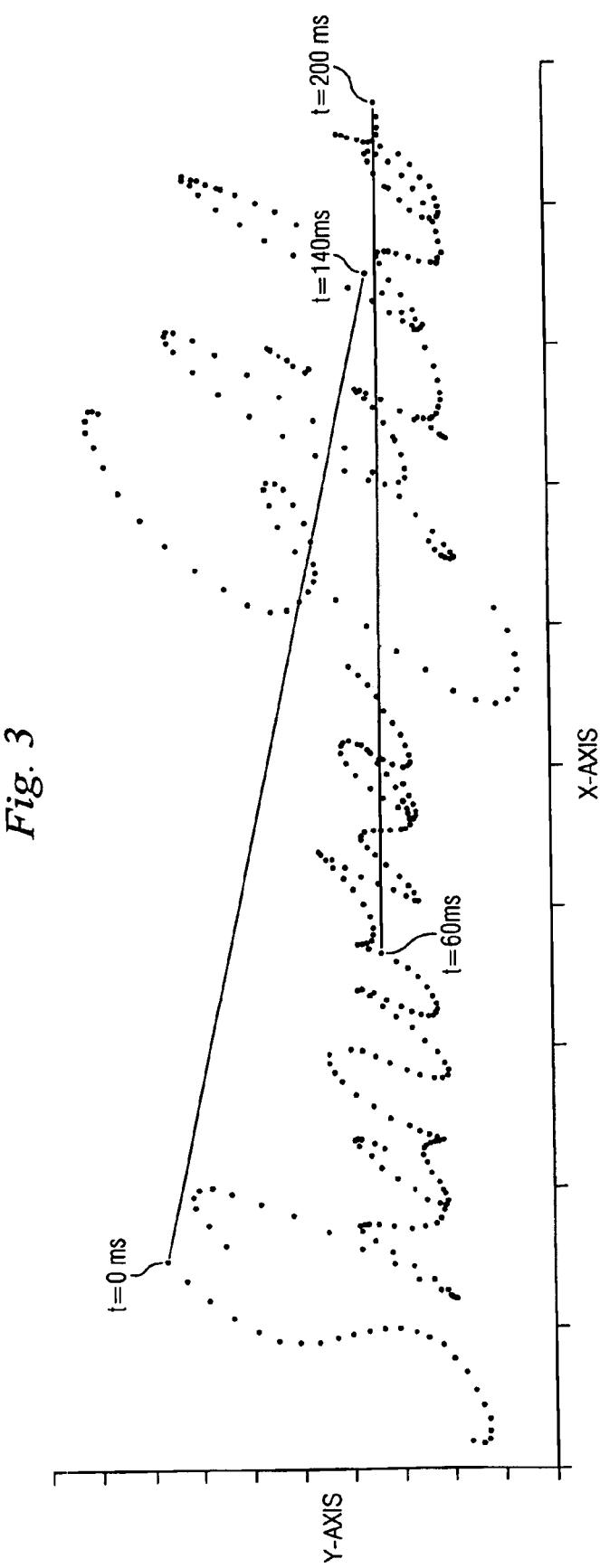
FIG. 3 depicts two intervals taken with respect to a sampled signature, in accordance with the present invention.

The first hierarchical zooming will be on the time interval from $t_0$ to $t_{max}$. The system uses several segmentation rates as follows. Suppose that the segmentation rate equals to 0.7 and two intervals are chosen; one interval is between 0 milliseconds to 140 milliseconds and the other is between 60 milliseconds to 200 milliseconds, as shown in FIG. 3. These two time segments represent a single iteration. The rule implemented in the present invention for the segmentation preferably is as follows.

First Interval Indices are:

Interval $_{I=1,a}$=(start index, start index+(end index−start index)×0.7)

Interval $_{I=1,b}$=(end index−(end index−start index)×0.7, end index)

Figure 4:
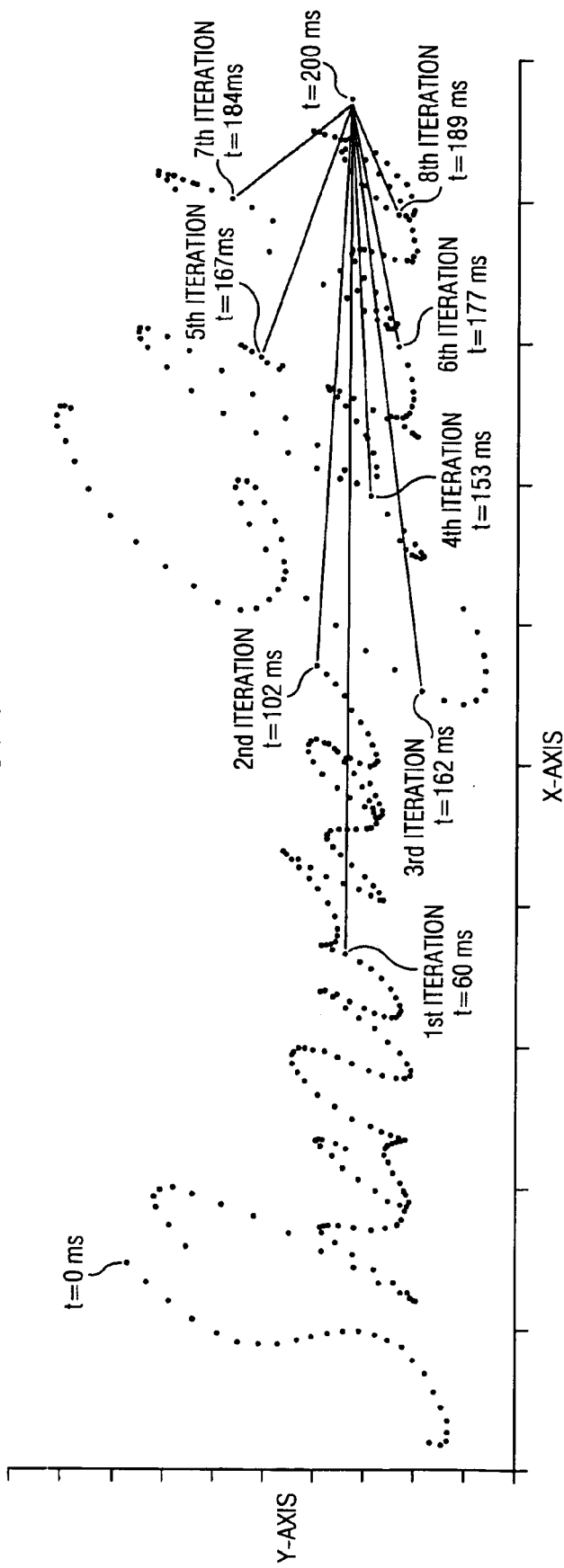
FIG. 4 shows a recursive iteration in accordance with the present invention.

The segmentation process is a recursive process which repeats on each one of the parent intervals for 13 zooming iterations. This process can be thought of as a "What/Where" iconic conversion. Every iteration calculation is based on a single rate. A recursive iteration of the right branch is shown in FIG. 4.

For stability reasons, the process is repeated for different segmentation rates, once for 0.5 (i.e., no overlapping between the two intervals), the next for 0.52, the next for 0.54, and so on up to rate of 0.7. Each iteration records the two dimensional vectors, which are generated by subtracting the start point from the end point. The difference vectors are being divided by the length of a parent iteration vector (equipped with a "division by zero" prevention algorithm) in order to detect internal signature size invariant proportions. This process explores proportional geometric and biometric relations.

In a preferred embodiment of the present invention, the zooming ratio is defined as the 13th root of 2/n where n is the number of distinct (x,y) points. This embodiment ensures that after 13 iterations, the time interval is between 2 successive samples. For example, assume the signature consists of 200 (x,y) points, then (2/200) to the power of 1/13 is about 0.7. This means that the intervals shrink by a factor of 0.7 in each iteration. The instant embodiment is particularly desirable with relatively long signatures. Specifically, in such longer signatures, the last iteration, without the implementation of the instant scheme, would reach final intervals that are too long, whereby the system becomes insufficiently sensitive to local features of long signature curves.

In accordance with the preferred embodiment of the present invention, however, the system truncates long signatures. This does not inhibit the verification process because in long signatures there are enough features such that instability at the end of the signature (due to unstable truncation) is compensated for. Accordingly, where other signature verification systems might implement more neurons, the present invention, with a limited number of neurons, achieves sufficient reliability based, possibly, only on a hand gesture resulting in three to five Latin letters.

It is noted that in the present embodiment of the present invention, the number of neurons used is 32 and the dimension of the vector space which is analyzed by the neural network is 26. Each iteration of the recursive zooming generates a two dimension vector and 13 iterations are executed resulting in 13×2=26 dimensions. However, in alternative embodiments, different numbers of neurons and dimensions of vector space as well as a different number of iterations may also be used depending on the desired accuracy and the system capacity. Thus, the example discussed herein should not be considered as a limitation of the present invention but merely one example.

The above process converts the three dimensions raw data vectors, into high dimensional vectors of 26 dimensions. The 26 dimensions are derived from the collections of 13 recursive intervals (zooming in), each interval's end—start vector has x & y coordinates and these coordinates preferably are recorded into a buffer. The buffer becomes full each time the recursive process reaches the maximal depth 13. Each iteration fills two places in the buffer. In a preferred embodiment, when the buffer is full, i.e., has 26 values, it is written into a sequential records file. The entire recursive process preferably lasts only a few seconds.

This process will not always generate the same vectors; however, the whole set of vectors can be represented as the unification of clusters of 26 dimensional points. Points are not just sporadically scattered in $R^{26}$. The fact that the clusters will not always repeat, is well treated by the "improved Pi neuron" which is the last processing phase of the neural network, discussed later. Indeed, the clusters' irrepeatability was the incentive for the improved Pi-neuron. The output file of the predefined process becomes the input of the neural network 300.

In a human analogy, the predefined process acts like the early vision stages in the visual cortex of the vertebrates.

C—High Order Principal Component Extraction Process.

Figure 5:
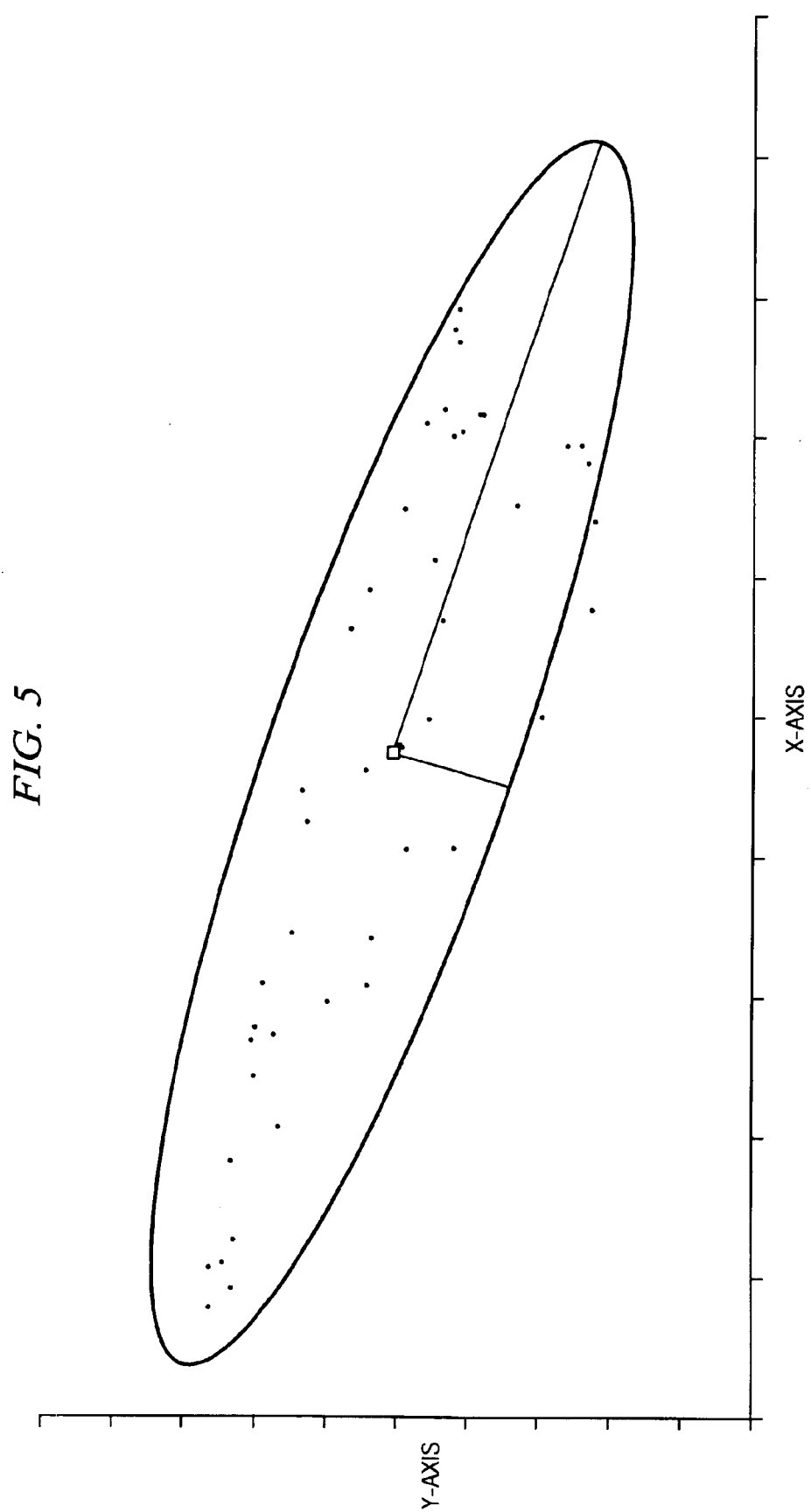
FIG. 5 illustrates a dedicated ellipsoid neuron in accordance with the present invention.

Principal component extraction is executed in an unsupervised neural network 300 by a method which implements geometry to extract the main ellipsoid directions. Such neurons are known as Second Order Neurons. The neuron learns to identify clusters of high dimension points using a high dimension ellipsoid. Each neuron uses a dedicated ellipsoid. As an example, such an ellipsoid is shown in FIG. 5. In this Figure it is readily seen that the described ellipsoid has two main directions (according to a flat two dimensions cluster of points).

In the unsupervised neural network of the present invention, the neuron identifies close points, which form a cluster and gradually "moves" it's center point at a predefined rate to the middle of the cluster (the middle of the cluster is calculated by averaging it's points). This is done by competitive self-organization. The main directions of the ellipsoid are gradually updated with each new point that the neuron learns. This unique technique is described in the following paragraph.

The ellipsoid main directions extraction is accomplished by the unique "Cumulative Ortho-Normalization" technique.

Figure 6:
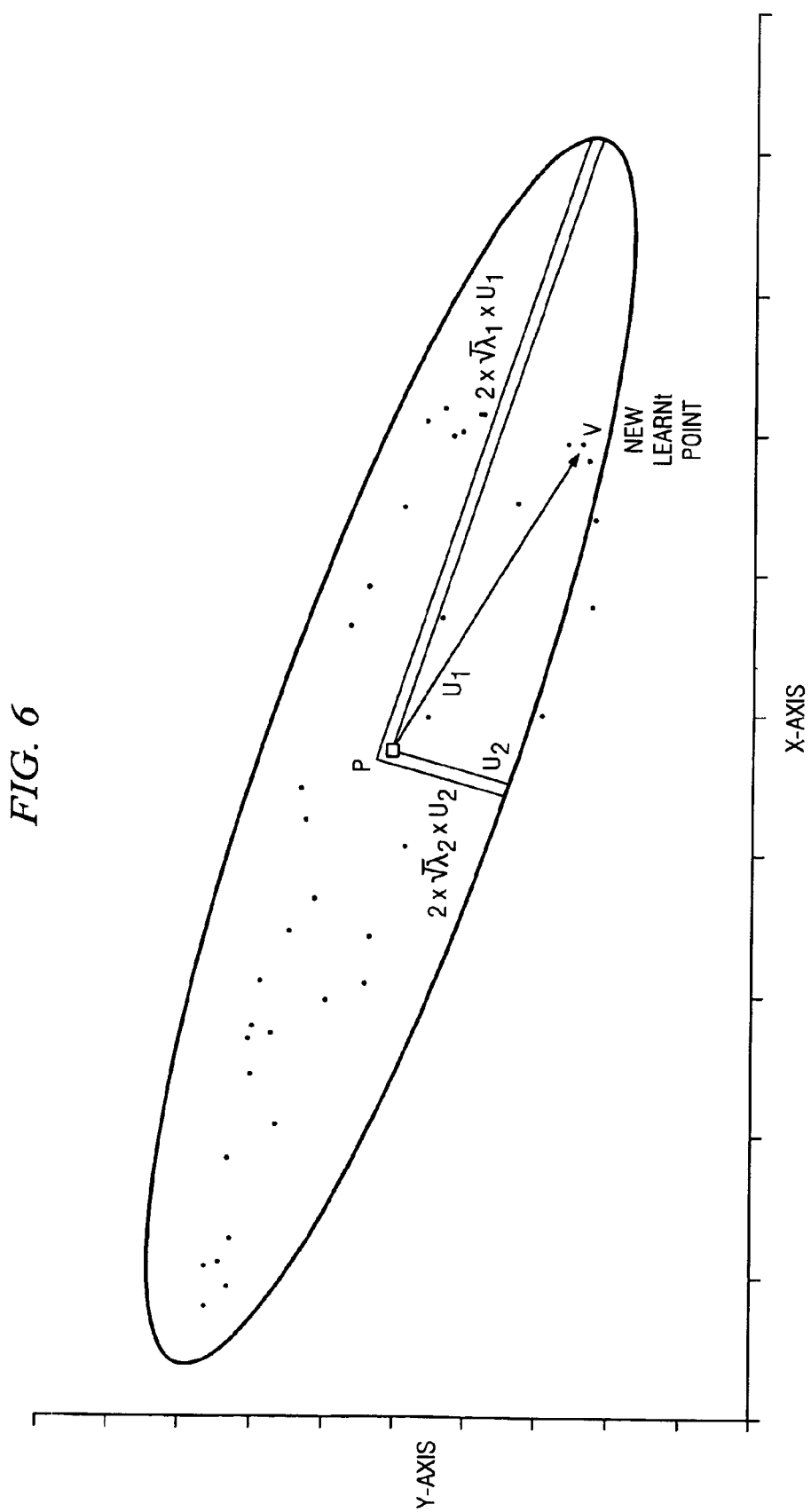
FIG. 6 shows main ellipsoid directions in accordance with the present invention.

Let V denote the difference vector between the position value of the neuron (center point of the ellipsoid) and a new learned value. Let P denote the position of the neuron in n dimensions (center point of the ellipsoid). Let $U_1, U_2, \ldots U_n$ denote the main ellipsoid unit directions. And, let $\lambda_1, \lambda_2, \ldots, \lambda_n$ denote the projection variances of the cluster points on the main ellipsoid directions. Each of these defined values is depicted in FIG. 6.

It is important to note that the $2*\sqrt{\lambda}$ calculated value (where $\lambda$ represents the variance) counts for most (about 95%) of the sample space which is included in that range.

Assume that the $\lambda$ values are the Eigenvalues of the correlation matrix. To refrain from using a conventional high time complexity correlation matrix and its diagonalization, the following new technique is employed whereby main directions extraction is simplified.

Figure 7:
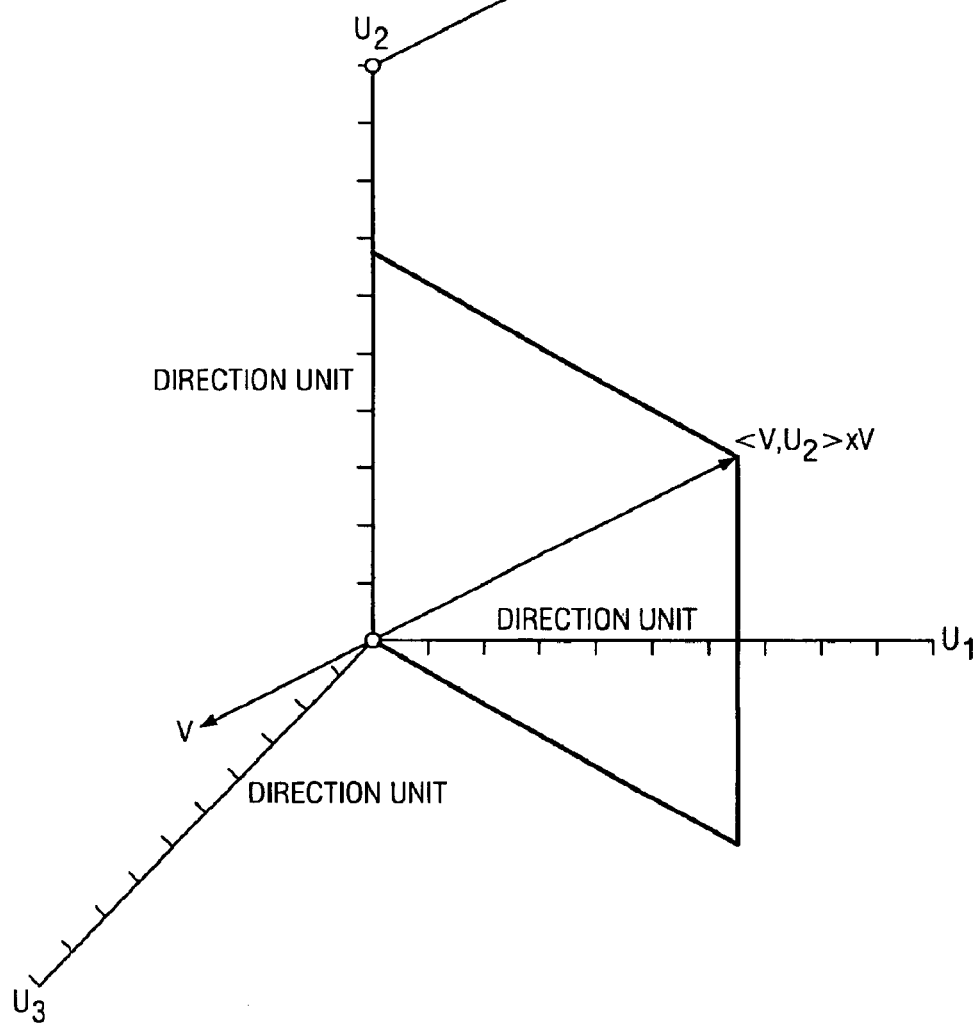
FIG. 7 shows variances of projected distance along Ui, i=1, 2, . . . n, in accordance with the present invention.

The mathematical values of the $\lambda$'s are the variances of the projected distance along the $U_i$, i=1,2, . . . n unit directions. An example for i=2 is shown in FIG. 7. In the following section and associated figures, m will denote the number of learned vectors (samples).

The $U_i$s are set to initial values of a multiplication of the ordinary base in order to avoid too small ellipsoids. For example, U1=(100,0,0,0, . . . ), $U_2$=(0,10,0,0, . . . ), $U_3$=(0, 0,100,0, . . . ), . . . etc.

The updating process starts from i=1 up to i=n, (in 26 dimensions n=26).

$U_1$ will serve as the highest main ellipsoid's direction; $U_2$ will serve as the second ellipsoid's direction, etc.

The term: [V*<V, $U_1$>] is added

To: [m*$\lambda_1$*$U_1$] where m is the number of learnt vectors. (The old m*$\lambda_1$*$U_1$ is actually the square ellipsoid main direction).

Let the new main square direction be denoted vector by Y, where $Y=V^*<V, U_1>+m^*\lambda_1^*U_1$.

Another way to define Y is:

$Y=V^*\text{Sign}(<V, U_1>^*\|V\|+m^*\lambda_1^*U_1$, where $\|V\|$ is the norm of V.

If the inner product <V, $U_1$>, which is a projection on VI is negative, then the added vector V*<V, $U_1$> points to the positive hemisphere direction which is pointed by $U_1$. The positive hemisphere is all the Z vectors such that <Z, $U_1$>>=0.

If <V, $U_1$> is positive then the V*<V, $U_1$> vector is also in the positive hemisphere which is formed by $U_1$. This means that summations will not cancel each other but will rather work in a cumulative manner. This is the basis for the Cumulative Ortho-Normalization technique.

The new $U_1$ vector will be $U_1$=Y/|Y|. Therefore, it will be a new unit vector.

The new $\lambda_1$ is just calculated as: (m*$\lambda_1$+<V,Y/|Y|>$^2$)/(m+1), where m is the number of previous points that the neuron has learned. This means that a new squared sum is added to the old sum of square projections on the VI direction. So m*$\lambda_1$ is actually the sum of all squares.

$\lambda_1$=Sum of square projections on the first main direction divided by the number of learned vectors (samples). The new m*$\lambda_1$*$U_1$ vector is the new square main ellipsoid direction.

The process then proceeds to $U_2$ . . . .

We add V*<V, $U_2$> to m*$\lambda_2$* $U_2$.

Again we have Y=V*<V, $U_2$>+m*$\lambda_2$*$U_2$.

Or, in another way, V*Sign (<V, $U_2$>)*$\|V\|$+m*$\lambda_2$*$U_2$.

It is then preferable to keep Y perpendicular to the already calculated $U_1$.

Accordingly, a new vector Z=Y–<Y, $U_1$>*$U_1$ is calculated.

By this the component of Y which is parallel to $U_1$ is subtracted.

Z is then normalized and a new $U_2$=Z/|Z|.

Again, the new $\lambda_2$ will just be calculated as (m*$\lambda_2$+<V, Z/|Z|>$^2$)/(m+1). In that way the square value of the projection on the new V2 is added to m*$\lambda_2$ and divided by m+1 so $\lambda_2$ will just be the sum of squared projections divided by the number of learned vectors (samples).

The process continues by adding V*<V, $U_3$> to m*$\lambda_3$*$U_3$.

Again we have Y=V*<V, $U_3$> to m*$\lambda_3$*$U_3$.

Or, in another way V*Sign (<V, $U_3$>)*$\|V\|$+m*$\lambda_3$*$U_3$.

The projections are then subtracted on the previous main directions so:

$Z=Y-<Y, U_1>^*U_1-<Y, U_2>^* U_2$

The new $U_3$ unit vector will just be new $U_3$=Z/|Z|.

Again, the new $\lambda_3$ will just be calculated as (m*$\lambda_3$+<V, Z/|Z|>$^2$)/(m+1).

This process continues until all the main ellipsoid directions are updated. After the last main direction is calculated, the process approaches its end.

Additionally, a variable P is also kept. P is the average of the learned vectors and also an additional point, which is used as the neuron location. This may sound somewhat unusual, but evidently when using P for ellipsoid calculations and L (neuron location) for competition, the network differentiation is improved. The process also uses a rate by which L approaches P. According to the present invention, L does not move towards a new learned point but rather towards P, the average of all the learned points. While this duality might use additional memory, the advantages obtained thereby outweigh any apparent disadvantages.

In the preferred embodiment, there is provided in the unsupervised neural network 300 unbounded growth prevention rules. By these rules there is eliminated the situation of one dominant winner ellipsoid (that learns too much data) or, on the other hand, becomes a degenerated ellipsoids. Each ellipsoid has a winning counter. Whenever the neuron wins, the counter is incremented. The Neural Network becomes less competitive if a winning neuron has over two times winnings over a close neighbor. At that stage the neighbor will be also updated for input vectors with distances which fulfill the condition, (Minimum Distance from Winning Neuron)/(Distance from Neighbor)>=0.7.

Whenever a neuron wins "too many times", the network behaves like a Kohonen network. The condition acts as a fortification of weak neurons and therefore acts as a constructive condition. It is important to say that it is a good condition for connected clusters but will not always be appropriate for data, which is scattered in R n in disconnected clusters.

To summarize the above, in the present high order principal components extraction process the topology of the signature is learned by the unsupervised second order ellipsoid neural network. The learned signature topology includes biometric and geometric characteristics.

D—Component Integration—First Stage Process.

After the second order neurons (High Order principal components) finish learning the topology of the data vectors in $R^{26}$, the component integration 400 starts.

All the sample signatures are sent to the system one by one again. The process uses the signatures and builds the grounds for the verification that geometric and biometric characteristics are preserved in future compared signatures.

The second order ellipsoid neurons are kept fixed while two statistic measurements are learned for each signature and for each second order ellipsoid neuron as follows:

The process learns the proportion r between the number of vectors within an ellipsoid and the total number of vectors. It learns the average value of r and the standard deviation of r. r is calculated in relation to the number of sample signatures. This process of calculating r is called Temporal Summation.

A second process averages the distance of all the vectors within an ellipsoid. Distances are measured from the center of the ellipsoid. Here, let s denote this value. The process learns the average value of s and it's standard deviation when testing all the sample signatures. s is calculated in relation to the number of sample signatures. This process of calculating s is called Average Temporal Summation. These calculated values are then passed to conventional Pi-neurons 430.

Thus, in summary, the accumulation of data which is performed by the Temporal Summation and the Average Temporal Summation is used as a means for extracting data out of the large numbers of vectors, not necessarily out of any preferred cluster/bubble. Even if the neurons miss the center of the cluster, the Temporal Summation and the Average Temporal Summation are useful.

E—Component Integration—Second Stage Process

All the sample signatures are then passed to the improved Pi-neuron 500 one by one for further component integration. Referring to the last paragraph of the previous section, two values are calculated for each signature and for each second order neuron.

A=(Average r-current signature sample r)$^2$/(Variance of r).

B=(Average s-current signature sample S)$^2$/(Variance of s).

The output value for each one of the ellipsoids is the multiplication A*B, where B—measures local structure deviations, and
A—measures global structure deviations.

The process treats these values as independent probabilities. This is one of the reasons for the multiplication. Another more basic idea is that A*B is usually more stable than A+B or A or B. This can be shown in experiment.

For each second order neuron the result A*B is an input of the last neuron, the improved Pi-neuron 500. Again, it is a multiplication neuron.

Let us denote the values of A*B of each ellipsoid as $X_i$ such that i=1,2, . . . k, where k equals to the number of neurons. The $X_i$ values are sorted in descending order where $X_0$ is the greatest value. The neuron starts multiplying the $X_i$ values until the multiplication is less than 1. If no such condition is achieved, the signature is discarded.

The first i which satisfies $X_0*X_1* \ldots *X_i<1$ is remembered. The maximal value of i is learned by the improved Pi-neuron 500. A value of 1 or 2 is added to Maximum i. The new i+1 or i+2 value is denoted by J.

When the system compares a new signature, the $X_i$ values are sorted and the multiplication up to index J is calculated. If the value of the multiplication is greater than 1, the system identifies the signature as a false one.

The ideas behind the Improved Pi Neuron according to the present invention include (1) the multiplication is a means of verifying that signature characteristics simultaneously appear (multiplication is like the AND operator) and (2) it is preferable to avoid a multiplication of too many small values, which can cause false verifications.

The multiplication allows deviations of the characteristics of the tested signature as long as there are still enough characteristics, which are unique to the person who owns the signature.

Characteristics of the Improved Pi Neuron

The number of required $X_i$, which is the number of second order neurons, depends on the signature complexity. For example, for signatures effected with a mouse, 20 neurons typically are sufficient. For long signatures, on the other hand, delivered via a digitizing pad, 32 to 40 neurons are more preferable.

Assessment of Overgeneralization

In addition to the above-described five major components 100, 200, 300, 400 and 500, the present invention preferably also implements a criteria for assessing Overgeneralization. Overgeneralization is a situation in which the irrepeatability or over-simplicity of the learnt signature can cause the system to accept false signatures as authentic. In general, if 1out of, for example, 7 letters of a signature is spoiled, then the system should still reliably identify the signature. This desirable system characteristic is made possible by the compensation process which exists in the Improved Pi Neuron.

If too many changes in the original signature are still accepted, then the system is termed as Overgeneralized. The standard deviation, which is learned by the Temporal Summation and Temporal Summation neurons, preferably should have small values in comparison with the average values. To make sure that no overgeneralization exists, it is sufficient that half of the Neurons of the Component Integration—First Stage 400 agree with the condition:

Average*Average/Variance>50 (or other predefined threshold)

In a preferred embodiment, the system requires that at least 10 (Temporal Summation & Average Temporal Summation) neurons (out of 32*2=64) comply with such a condition. Stricter requirements can be imposed for at least 16 to 32 neurons out of the 64 of the Component Integration—First Stage.

It is important to note that the system of the present invention implements the instant special tool for the assessment of Overgeneralization, which tool is rarely, if ever, incorporated in other signature authentication systems. Indeed, the implementation of the tool is a direct result of the structure of the Component Integration process.

Criterion for Canceling Overgeneralized Neurons

As noted above, the signature verification system of the present invention preferably uses the following condition for canceling overgeneralized Temporal Summation and Average Temporal Summation neurons:

Average*Average/Variance>Predefined Threshold.

That is, the variance preferably has to be relatively low. Table 1 presents statistical values of a neural network trained 10 times with different signatures. It is expected that the network contains no information.

TABLE 1

| Competitive Neuron index | Temporal Summation Average$^2$/Variance | Average Temporal Summation Average$^2$/Variance |
|---|---|---|
| 0 | 6.4 | 2.8 |
| 1 | 7.7 | 2.2 |
| 2 | 3.3 | 1.7 |
| 3 | 1.3 | 0.6 |
| 4 | 0.1 | 0.1 |
| 5 | 2.5 | 1.1 |
| 6 | 0.8 | 0.7 |
| 7 | 3.0 | 0.8 |
| 8 | 6.8 | 2.3 |
| 9 | 1.8 | 0.9 |
| 10 | 0.1 | 0.1 |
| 11 | 0.6 | 0.4 |
| 12 | 0.1 | 0.1 |
| 13 | 0.1 | 0.1 |
| 14 | 0.1 | 0.1 |
| 15 | 0.1 | 0.1 |
| 16 | 5.9 | 1.3 |
| 17 | 6.9 | 2.4 |
| 18 | 2.9 | 0.9 |
| 19 | 0.1 | 0.1 |
| 20 | 0.8 | 0.8 |
| 21 | 0.1 | 0.1 |
| 22 | 0.1 | 0.1 |
| 23 | 7.4 | 1.2 |
| 24 | 0.6 | 0.6 |
| 25 | 0.2 | 0.2 |
| 26 | 0.1 | 0.1 |
| 27 | 0.1 | 0.1 |
| 28 | 0.6 | 0.5 |
| 29 | 3.3 | 2.0 |
| 30 | 3.2 | 1.6 |
| 31 | 0.8 | 0.6 |

On the other hand, comparison with Table 2 of values of a network, which was trained with 10 repeated signatures of the same person, shows the way significant statistical values are represented by the neural network. The analysis shows the statistical basis of the component integration implementation. It also shows the justification for the criterion for the cancellation of overgeneralized neurons.

TABLE 2

| Competitive Neuron index | Temporal Summation Average^2/Variance | Average Temporal Summation Average^2/Variance |
|---|---|---|
| 0 | 78.16 | 15.36 |
| 1 | 169.02 | 9.54 |
| 2 | 864.07 | 18.83 |
| 3 | 325.66 | 25.53 |
| 4 | 204.73 | 10.68 |
| 5 | 281.87 | 12.78 |
| 6 | 71.39 | 71.55 |
| 7 | 733.43 | 28.84 |
| 8 | 46.89 | 34.66 |
| 9 | 536.31 | 72.46 |
| 10 | 2381.02 | 129.76 |
| 11 | Canceled (Weak Neuron) | Canceled (Weak Neuron) |
| 12 | 1011.12 | 55.8 |
| 13 | 71.95 | 9.57 |
| 14 | 932.93 | 36.26 |
| 15 | 516.32 | 76.62 |
| 16 | 95.08 | 5.24 |
| 17 | 0.426 (Over generalized) | 0.45 (Over generalized) |
| 18 | 212.03 | 25.62 |
| 19 | 426.96 | 35.49 |
| 20 | 45.82 | 7.11 |
| 21 | 17.44 | 2.88 |
| 22 | 58.52 | 5.19 |
| 23 | 382.54 | 123.94 |
| 24 | 787.41 | 127.36 |
| 25 | 199.71 | 33.97 |
| 26 | 286.72 | 31.08 |
| 27 | 83.22 | 30.29 |
| 28 | 226.77 | 25.18 |
| 29 | 221.87 | 26.67 |
| 30 | 287.85 | 17.25 |
| 31 | 205.08 | 16.74 |

The system of the present invention has two modes, one for updating the neural network weights (the learning mode) and one for comparing a new signature's features to the already learnt features (the comparing mode).

The Learning Mode—Phase 1.
  Signature sampling—The system samples a signature.
  Predefined Process—The system translates the raw data into high dimension vectors.
  Unsupervised High Order principal components extraction—The system learns the clusters, which are formed by these vectors in a high dimension Real Numbers Space—$R^n$.

The Learning Mode—Phase 2.
  Signature sampling—The system samples a signature.
  Predefined Process—The system translates the raw data into high dimension vectors.
  Unsupervised High Order principal components comparison—The process does not update the ellipsoid's main directions. It just feeds the next layer.
  Component Integration—first stage—the averages of s and r and their variances are learned.

The Learning Mode—Phase 3.
  Signature sampling—The system samples a signature.
  Predefined Process—The system translates the raw data into high dimension vectors.
  Unsupervised High Order principal components comparison—The process does not update the ellipsoid's main directions. It just feeds the next layer.
  Component Integration—first stage—the layer calculates A and B and their multiplication Component Integration—second stage—The Improved Pi Neuron learns the index J By the above three stages, the learning process is concluded.

The Comparison Mode
  This mode has only one stage as follows:
  Signature sampling—The system samples a signature
  Predefined Process—The system translates the raw data into high dimension vectors
  Unsupervised High Order principal components comparison—The process does not update the ellipsoid's main directions; it just feeds the next layer
  Component Integration—first stage—the layer calculates A and B and their multiplication
  Component Integration—second stage—The Improved Pi Neuron calculates the multiplication of $A_j*B_j*A_2*B_2* \ldots *A_j*B_j$ up to and including index J. The multiplication is just one or two index numbers above the worst case maximal index The result of the multiplication should be less than 1. If it is greater than 1, it means that the new compared signature differs from the learned signatures. A result of between 1 and 100 is designated a gray range which usually means that some similarity exists but certainly not enough to be sure that the signature is not a forgery. Of course, the actual scale or criteria implemented will depend on specific requirements.

In view of all of the foregoing, it is readily seen that the present signature authentication system is different from prior art systems. Specifically, the early preprocessing is executed by an algorithm and not by a neural network. This is done in order to reduce memory and disk space requirements. Furthermore, the preprocess implements a hierarchical iconic zooming process in order to convert the signature raw data coming from the signature sampling sub-process. In an alternative embodiment, the preprocess is replaced by a "What/Where" network if no biometric data is available. In the preferred embodiment, the signature raw data is converted to 26 dimensions high order vectors.

There are also important improvements in the neural networks aspect of the present invention. Specifically, (1) the data storage in the system preferably is solely in self organized neural networks. (2) In the second order neurons a geometric method of training/learning is used. No explicit diagonalization exists. There is no explicit use of a correlation matrix. By this, calculations become much faster. This is very important because self organized neural networks usually need many iterations and therefore are time consuming. (3) The second order neurons feed another layer of first order neurons. This concept is contradictory to the model in which high order neurons are the last "bus stop". (4) Pi ($\pi$) neurons are used in the Components Integration phase. This is not very common in neural networks, and heretofor unknown in signature authentication systems employing neural networks. (5) The last output Pi neuron that is used, is not an ordinary Pi neuron. It is a neuron which sorts the input values and then calculates the multiplication up to a "stability index". (6) Finally, the present invention implements cooperative unsupervised neural networks. In contrast, well-known prior art signature authentication solutions usually adopt supervised neural networks.

It is noted that instant invention can be implemented fully either on a personal computer or mainframe type computer, or any combination thereof. Additionally, such computers preferably are connected in conventional manner to the Internet to facilitate on-line transactions.

While the present invention has been described with reference to preferred embodiments, it will be understood by those skilled in the art that various changes may be made and equivalents may be substituted for elements thereof without departing from the scope of the invention. For instance, as previously noted, circular/bubble shaped neurons may be used instead of elliptical neurons. In addition, many modifications may be made to adapt a particular situation or material to the teachings of the invention without departing from the essential scope thereof. Moreover, different numbers of dimensional vectors and different iterations may be used than the above discussed embodiment to increase accuracy or as required by system requirements. Therefore, it is intended that the invention not be limited to the particular embodiments disclosed as the best mode contemplated for carrying out the invention, but that the invention will include all embodiments falling within the scope of the appended claims.

What is claimed is:

1. A method of electronically learning a signature, comprising the steps of:
sampling a signature and obtaining raw data representative thereof using a recursive sampling process;
translating the raw data into high dimension vectors; and
extracting, via an unsupervised neural network, high order principal components of the high dimension vectors by cumulative ortho-normalization.

2. The method of claim 1, further comprising integrating the high order principal components by generating a value r corresponding to a ratio of the number of vectors within an ellipsoid to the total number of vectors and a value s, the value s corresponding to the average of distances of all vectors within the ellipsoid.

3. The method of claim 2, further comprising:
calculating a value A=(average r−current signature sample r)$^2$/(variance of r) and B=(average s−current signature sample s)$^2$/(variance of s); and
multiplying the values A and B together.

4. The method of claim 3, wherein multiplying the values A and B together comprises multiplying the values A and B together in a Pi neuron.

5. Software for electronically learning a signature, the software encoded in media and operable when executed to:
sample a signature and obtaining raw data representative thereof using a recursive sampling process;
translate the raw data into high dimension vectors; and
extract, via an unsupervised neural network, high order principal components of the high dimension vectors by cumulative ortho-normalization.

6. The software of claim 5, further operable to integrate the high order principal components by generating a value r corresponding to the ratio of the number of vectors within an ellipsoid to the total number of vectors and a value s, the value s corresponding to the average of distances of all vectors within the ellipsoid.

7. The software of claim 6, further operable to:
calculate a value A=(average r−current signature sample r)$^2$/(variance of r) and B=(average s−current signature sample s)$^2$/(variance of s); and
multiply the values A and B together.

8. The software of claim 7, wherein the software operable to multiply the values A and B together comprises the software operable to multiply the values A and B together in a Pi neuron.

9. A computer for electronically learning a signature, comprising:
memory; and
one or more processors collectively operable to:
sample a signature and obtaining raw data representative thereof using a recursive sampling process;
translate the raw data into high dimension vectors; and
extract, via an unsupervised neural network, high order principal components of the high dimension vectors by cumulative ortho-normalization.

10. The computer of claim 9, the one or more processors further operable to integrate the high order principal components by generating a value r corresponding to a ratio of the number of vectors within an ellipsoid to the total number of vectors and a value s, the value s corresponding to the average of distances of all vectors within the ellipsoid.

11. The computer of claim 10, the one or more processors further operable to:
calculate a value A=(average r−current signature sample r)$^2$/(variance of r) and B=(average s−current signature sample s)$^2$/(variance of 5); and
multiply the values A and B together.

12. The computer of claim 11, wherein the one or more processors operable to multiply the values A and B together comprise the one or more processors operable to multiply the values A and B together in a Pi neuron.

13. A system for electronically learning a signature comprising:
means for sampling a signature and obtaining raw data representative thereof using a recursive sampling process;
means for translating the raw data into high dimension vectors; and
means for extracting, via an unsupervised neural network, high order principal components of the high dimension vectors by cumulative ortho-normalization.

* * * * *